United States Patent [19]

Zahn

[11] 3,723,189

[45] Mar. 27, 1973

[54] THERMOELECTRIC DEVICE

[75] Inventor: Paul Zahn, Ottobrunn, Germany

[73] Assignee: Messerschmitt-Bolkow-Blohm GmbH, Munich, Germany

[22] Filed: Aug. 6, 1969

[21] Appl. No.: 849,289

[30] Foreign Application Priority Data

Aug. 10, 1968 Germany.....................P 17 64 816.7

[52] U.S. Cl...................................136/205, 136/204

[51] Int. Cl................................................H01v 1/02

[58] Field of Search......................136/203–205, 211, 136/212, 230

[56] References Cited

UNITED STATES PATENTS

| | | | |
|---|---|---|---|
| 3,074,242 | 1/1963 | Lindenblad | 136/203 X |
| 3,124,936 | 3/1964 | Melchy | 136/203 X |
| 3,248,889 | 5/1966 | Zimmerman | 136/204 |
| 3,279,955 | 10/1966 | Miller et al. | 136/205 |
| 3,359,139 | 12/1967 | Lindenblad | 136/205 |
| 3,441,449 | 4/1969 | Green | 136/203 |

FOREIGN PATENTS OR APPLICATIONS

| | | | |
|---|---|---|---|
| 676,731 | 12/1963 | Canada | 136/204 |

OTHER PUBLICATIONS

Advances in Energy Conversion Engineering, from the Intersociety Energy Conversion Engineering Conference, Miami Beach, Florida, August 1967, "Design and Development of High Efficiency Cascaded and Segmented Thermoelectric Module, by Rocklin, pp. 207–219.

*Primary Examiner*—Benjamin R. Padgett
*Assistant Examiner*—Harvey E. Behrend
*Attorney*—McGlew and Toren

[57] ABSTRACT

A staged thermoelectric device comprises a plurality of semiconductor segments and thermocouples. The segments are of different materials chosen according to the particular effective temperature ranges — in the following designated as stages — in which they will operate and according to the required electrical polarity. All the segments of one stage are connected thermally in parallel, whereas the stages are interconnected thermally in series. The arrangement is such that the number of segments within the individual stages differs and at least two segments of each stage are connected electrically to form segmented legs of an individual thermocouple, while the remaining segments of each stage are connected electrically in series to form additional thermocouples within the respective stage.

6 Claims, 4 Drawing Figures

INVENTOR
Paul Zahn
By McGlew and Toren
ATTORNEYS

THERMOELECTRIC DEVICE

SUMMARY OF THE INVENTION

This invention relates in general to a staged thermoelectric device and in particular to a new and useful thermoelectric device having semi-conductor thermocouples with segments of different materials according to the particular effective temperature ranges.

Staged thermoelectric devices for the transformation of thermal energy into electrical energy are well known in the art, for example from the publication "THERMOELECTRIC AND THERMOMAGNETIC EFFECTS AND APPLICATION" by T.C. Harmann, J.M. Honig, McGraw-Hill Inc., 1967. In contrast to thermocouples with legs of a single semiconductor material, staged devices combine legs of semiconductor materials such that they operate over their most efficient, though limited temperature range.

Staging can be achieved either by segmenting or cascading. Segmenting of thermoelectric devices is carried out by direct electrical and thermal connection of segments of different materials to form segmented legs of thermocouples, also called "sandwich-style legs." Cascaded thermoelectric devices comprise two different and independent stages, each stage being built up from a plurality of individual thermocouples. The various stages are electrically insulated against each other. The heat is transferred by means of a heat dissipator. With such a device electrical connections can only be made at both ends of the stages, either externally or in the interior. Heat flow and current flow are equal in segments of a common stage.

Both methods of staging have disadvantages. In cascaded devices there exists a relatively large and ineffective interstage temperature drop at the joints between the stages. Furthermore their construction is difficult if uneven thermal expansions are to be avoided which would lead to severe shear and tensile stresses with the result that the brittle thermoelectric materials would be affected or even damaged. The necessity of providing a rigid common heat dissipator for all the segments of one stage as well as the arrangement of the thermocouples in close relationship results in a plate-like configuration of complete converter units. The possibility of altering the form of thermogenerators is thus considerably reduced. For each particular power range respective individual designs of thermogenerators are necessary, and this is expensive and uneconomical.

Segmenting on the other hand has the disadvantage of the so-called electrical mismatch which reduces the theoretical efficiency of existing thermoelectric materials.

An analysis of the fundamental equations of thermoelectric power conversion shows that there exists an optimum ratio of electrical current to energy flow for certain thermoelectric materials in a given temperature interval. The connection of segments to form segmented legs consequently results in an approximately constant ratio of electrical current to energy flow through the segmented leg. This means that in general the individual segments do not operate at optimum efficiency. This electrical mismatch depends entirely on the properties of the material used and cannot be avoided merely by altering the geometry of the segments.

In a cascaded device the number of thermocouples within each stage can be chosen at will in order to obtain different values of ratio of electrical current to energy flow in each stage and thus eliminating the electrical mismatch.

In accordance with the present invention there is provided a device which includes segmented semi-conductor thermocouples for the transformation of thermal energy into electrical energy and for the attainment, by new division and distribution of the individual segments, of an optimal thermoelectric utilization of the thermal energy which is made available by the heat source, and hence to provide a higher thermoelectric efficiency. This is achieved in the inventive device by providing a thermocouple with a number of segments, in the individual temperature ranges, of distinct characteristics and by connecting the segments of a temperature range electrically in series and thermally in parallel. It is advantageous if, according to another feature of the invention, some of the segments of one temperature range be connected with the correlated segments of the same polarity of the other temperature range and that the remaining segments within this range be connected to form independent thermocouples., The segments comprise individual sections of semi-conductor materials which may form parts of a segmented leg of a thermocouple as well as a whole leg of a thermocouple. The division and arrangement of the individual segments of the thermoelectric device according to the invention, renders it possible to attain electrical adaptation of the thermocouple device and to considerably reduce the ineffective interstage temperature drop. These are advantages over known staged thermoelectric devices such as disclosed, for example, in the publication DESIGN AND DEVELOPMENT OF HIGH EFFICIENCY CASCADED AND SEGMENTED THERMOELECTRIC MODULE by S. R. Rocklin, published by the ATOMIC INTERNATIONAL, a Division of North American Aviation, Inc., (Advances in Energy Conversion, Intersociety Energy Conversion Conference, Miami Beach, August 1967), where it is, for example, indicated how to arrange segments forming legs of thermocouples for a device for the transformation of thermal energy into electrical energy in a cascade form in different temperature ranges so that besides a different geometric design of the individual legs the number of individual thermocouples within the temperature ranges may be varied.

The division and distribution of the segments according to the invention provides, however, besides the effect of good thermal and electrical adaptation, a particularly favorable construction of the device. The device is particularly useful as an energy converter in isotopic power generators where the heat source is in the form of a compact block on the surface of which any required number of thermoelectric devices according to the invention can be mounted in any desired distribution.

Experiments have shown that for practical applications it is especially advantageous if, according to a further feature of the invention, the number of segments of one temperature range in respect to the number of another temperature range is at the ratio of 1:2 or 1:3. Owing to these features it is possible to connect different stages without any appreciable interstage temperature drop thus improving the thermoelectric efficiency of present devices. In addition, a better matching of lead telluride and germanium silicon alloys to bismuth telluride thermoelectric semi-conductor materials in staged thermoelectric devices is possible.

According to a further characteristic the segments of one temperature range are connected with the segments of the other temperature range by means of flexurally slack bodies. In this manner the individual segments are interconnected for good thermal and, as the case may be, for good electrical conduction as well as elastically so that the individual segments can follow their thermal expansions, as well as those of their retentions or supports, without impairing the good thermal contact between the stages and without increased stresses within the segments. The elastic connection further renders it possible to rigidly connect the cold side of the thermocouples with a heat sink. Accordingly, it is an object of the invention to make use of the advantages of known cascaded and segmented thermoelectric devices but to eliminate their disadvantages and to provide a thermoelectric device which comprises a plurality of stages with different effective temperature ranges, each of said stages comprising a limited number of semiconductor segments made up of thermoelectric materials selected in dependence of the particular effective temperature range of said stages and the required electrical polarity, all said segments being arranged thermally in parallel within each of said stages, and wherein the number of said segments within at least two of said stages differs and segments of said stages are electrically connected with a corresponding number of segments of the same polarity of an adjacent stage, comprising an equal or larger number of segments, so as to form segmented multistage thermocouples. According to yet another feature of the invention the remaining segments within each of said stages are respectively interconnected within their common stage to form additional single-stage thermocouples which are electrically interconnected with the segmented thermocouples. Thus apparently all of the segments of the whole thermoelectric device are connected electrically in series.

A further object of the invention is to provide a thermocouple with an improved thermoelectric efficiency.

Yet another object of the invention is to provide a thermoelectric device which is simple in design, rugged in construction and economical to manufacture.

The various features of the invention which characterize the invention are pointed out with particularity in the claims annexed to and forming part of this specification. For a better understanding of the invention its operating advantages and specific objective attained by its use, reference should be had to the accompanying drawings and descriptive matter in which there are illustrated and described preferred embodiments of the invention. In the Drawings:

GENERAL DESCRIPTION OF THE PREFERRED EMBODIMENTS

Figure 1:
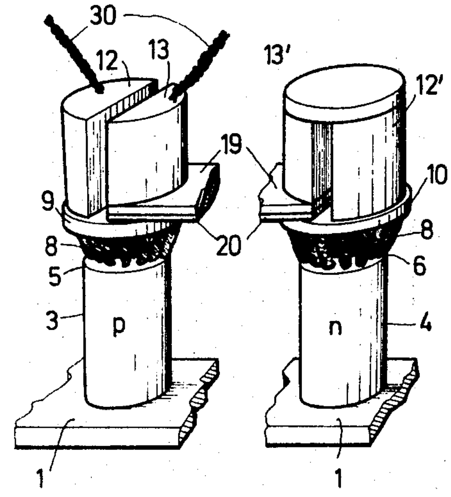
FIG. 1 is a perspective view of an arrangement in two stages of segments of semi-conductor materials, the number of segments in these stages being in the ratio of 1:2 in accordance with the invention.
Figure 1A:
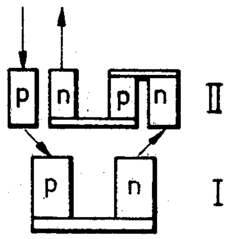
FIG. 1A is a schematic presentation of the electrical connection of the segments of FIG. 1.

Referring to the drawings, and particularly to FIG. 1, the embodiment of the invention illustrated therein comprises a heat receiving hot shoe 1 which may be connected in any suitable manner to a heat emitting source not shown. In the example illustrated the hot shoe 1 is a plate which is partly broken away in order to demonstrate that any other suitable shape may also be adopted. On the hot shoe 1 there are arranged a p-conductive segment 3 and an n-conductive segment 4 which consist of a semiconductor material, for example, of germanium-silicon or lead telluride (PbTe). The cold sides 5 and 6 of the segments 3 and 4 are connected to respective support plates 9 and 10 by means of flexurally slack elastic bodies 8. The bodies 8 comprise, for example, silver filaments which are twisted to form multi-stranded cable sections. As shown in FIG. 1 the support plates 9 and 10 support segments 12 and 13 and 12' and 13', respectively, which are made of respectively different semi-conductor material, for example, bismuth-antimony telluride $(BiSb)_2Te_3$. Segments 3 and 4 operate in a temperature range designated generally by I and the other segments which are arranged on the support plates 9 and 10, operate in a temperature range designated by II, as shown in FIG. 1A.

Each segment 3 and 4 has correlated with it two segments 12 and 13 and 12' and 13' of different semi-conductor material and hence segments which operate within a different temperature range, namely the temperature range of Group II. Of these segments, however, only the one having the same polarity as the segments 3 or 4 is electrically connected with segment 3 or 4 to form a segmented leg of a thermocouple. The other two segments 13,13' form, by connection with a bridge 19, an independent thermocouple. Bridge 19, of course is electrically insulated from the support plates 9 and 10 by an insulating layer 20.

Figure 2:
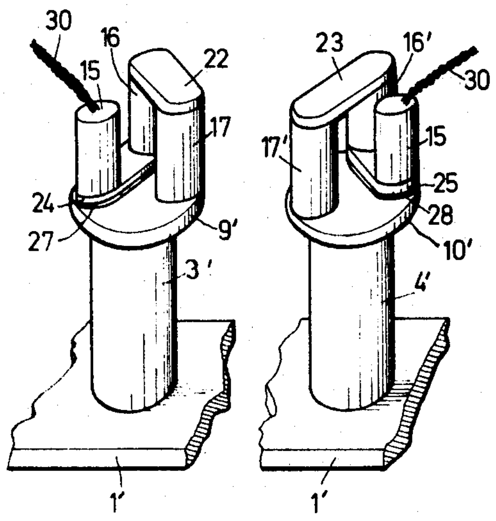
FIG. 2 is a view similar to FIG. 1 of another embodiment of the invention, wherein the ratio of segments between two stages is 1:3.
Figure 2A:
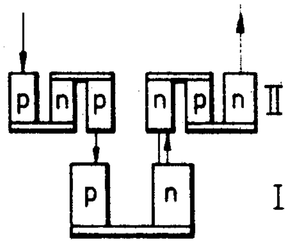
FIG. 2A is a schematic representation of the electrical connections of FIG. 2.

In the embodiment of FIG. 2, each segment 3' and 4' has correlated thereto three separate segments 15,16 and 17 and 15', 16' and 17', respectively. One segment of each polarity within stage II is connected with the corresponding segment of the same polarity of the semiconductor of the temperature range of group I, to form a segmented leg of a thermocouple. The other two segments 16 and 17 and 16' and 17' are interconnected by respective bridges 22 and 23 to form independent thermocouples. The connection of the individual segments of different stages is here rigid. The segments 15 and 16, and 15' and 16' respectively, are arranged on a common base plate 24, 25, respectively, which is electrically insulated from the correlated support plates 9' and 10°by an insulating layer 27,28, respectively. In the examples of construction indicated in FIGS. 1 and 2 the electrical output connections are marked with the reference symbol 30.

What is claimed is:

1. A staged thermoelectric device, usable as a module, including at least two thermoelectric semi-conductor stages each including plural segments of p-conductive and n-conductive semi-conductor materials, said stages being arranged thermally in series with each other; the first stage comprising two segments of different polarity with the segments arranged thermally in parallel with each other; the second stage comprising at least two segments arranged thermally in series with each respective segment of the first stage, the segments of said second stage thermally in series with each respective segment of said first stage being arranged thermally in parallel with each other with each segment having a polarity different from that of the adjacent thermally parallel segment; and means connecting all the segments of both stages electrically in series with each other.

2. A thermoelectric device, the improvement claimed in claim 1, wherein the ratio of the number of segments of each stage to the number of segments of the immediately preceding stage is 1:2.

3. A thermoelectric device as claimed in claim 1, wherein the ratio of the number of segments of each stage to the number of segments of the immediately preceding stage is 1:3.

4. A thermoelectric device, as claimed in claim 1, in which said first stage is the hot stage and said second stage is the cold stage.

5. A thermoelectric device, as claimed in claim 1, including a hot shoe electrically and thermally interconnecting the hot sides of said first stage segments of opposite polarity; a pair of electrically and thermally conductive plates; respective thermally and electrically conductive means interconnecting the cold side of each of said first stage segments to a respective support plate; the hot sides of the second stage segments being electrically and thermally connected to a respective support plate.

6. A thermoelectric device as claimed in claim 5, including electrically conductive bridges interconnecting the opposite polarity segments of each additional stage to form thermocouples.

* * * * *